United States Patent [19]

Yu et al.

[11] Patent Number: 4,898,904

[45] Date of Patent: Feb. 6, 1990

[54] METHOD TO MODIFY POLY(ARYLENE SULFIDE) RESINS

[75] Inventors: Michael C. Yu; Lacey E. Scoggins; Jerry O. Reed, all of Bartlesville, Okla.

[73] Assignee: Phillips Petroleum Company, Bartlesville, Okla.

[21] Appl. No.: 177,255

[22] Filed: Apr. 4, 1988

Related U.S. Application Data

[63] Continuation of Ser. No. 933,518, Nov. 21, 1986, abandoned.

[51] Int. Cl.⁴ .......................... C08K 5/09; C08K 5/13; C08K 3/22
[52] U.S. Cl. ................................. 524/399; 524/327; 524/394; 524/400; 524/430; 524/432; 524/433; 524/434; 524/436; 524/609; 525/537
[58] Field of Search ............... 524/394, 399, 400, 609; 525/537

[56] References Cited

U.S. PATENT DOCUMENTS

| | | | |
|---|---|---|---|
| 3,354,129 | 11/1967 | Edmonds et al. | 260/79 |
| 3,879,355 | 4/1975 | Blackwell | 260/79.1 |
| 3,919,177 | 11/1975 | Campbell | 260/79 |
| 3,998,767 | 12/1976 | Walton | 260/250 |
| 4,012,539 | 3/1977 | Davies | 524/609 |
| 4,017,450 | 4/1977 | Bailey | 524/609 |
| 4,020,054 | 4/1977 | Fodor | 524/399 |
| 4,071,509 | 1/1978 | Edmonds, Jr. | 524/400 |
| 4,148,966 | 4/1979 | Davies | 524/609 |
| 4,176,098 | 11/1979 | Needham | 524/399 |
| 4,178,271 | 12/1979 | Shue et al. | 524/400 |
| 4,183,840 | 1/1980 | Takahashi et al. | 524/609 |
| 4,189,194 | 2/1980 | Davies | 308/35 |
| 4,237,039 | 12/1980 | Blackwell | 524/396 |
| 4,247,598 | 1/1981 | Blackwell | 524/399 |
| 4,281,072 | 1/1981 | Wetton et al. | 524/609 |
| 4,373,091 | 2/1983 | Edmonds | 528/481 |
| 4,418,029 | 11/1983 | Reed et al. | 524/400 |
| 4,426,479 | 1/1984 | Deguchi et al. | 428/419 |
| 4,493,917 | 1/1985 | Bailleux et al. | 523/222 |
| 4,535,117 | 8/1985 | Mathis et al. | 524/397 |
| 4,613,654 | 9/1986 | Katto et al. | 525/537 |
| 4,746,698 | 5/1988 | Kouyama et al. | 524/609 |

FOREIGN PATENT DOCUMENTS

| | | | |
|---|---|---|---|
| 67676 | 12/1982 | European Pat. Off. | 524/609 |
| 119607 | 9/1984 | European Pat. Off. | 524/609 |
| 140370 | 5/1985 | European Pat. Off. | 524/400 |
| 3517452 | 11/1985 | Fed. Rep. of Germany | 8/675 |

OTHER PUBLICATIONS

Jerry Marsh "Acids and Bases", 1968, Chapter 8, pp. 217–222 from Advanced Organic Chemistry: Reactions, Mechanisms and Structure (Book).

*Primary Examiner*—Lewis T. Jacobs
*Assistant Examiner*—David W. Woodward
*Attorney, Agent, or Firm*—Richmond, Phillips, Hitchcock & Umphlett

[57] ABSTRACT

Poly(arylene sulfide) resins are modified by melt mixing a resin with a basic additive to form a resin product composition. The basic additive is selected from the group consisting of inorganic hydroxides, inorganic oxides and organic metal salts wherein the metals are from Group IA, IIA, or IIB and the salts are of carboxylic acids and phenols. The product compositions are suitable for injection molding, film forming and fiber spinning processes.

10 Claims, No Drawings

METHOD TO MODIFY POLY(ARYLENE SULFIDE) RESINS

This application is a continuation of application Ser. No. 933,518, filed Nov. 21, 1986, now abandoned.

The invention relates to poly(arylene sulfide) resins. The invention further relates to a process to modify the melt flow rate of poly(arylene sulfide) resins. Still further the invention relates to injection molding of poly(arylene sulfide) resins.

BACKGROUND OF THE INVENTION

The use of poly(arylene sulfide) resins for injection molding is well known in the art. Poly(arylene sulfide) resins suitable for injection molding generally have a melt flow rate of less than about 100 grams per 10 minutes. Such resins can be prepared by processes such as described No. in U.S. 3,919,177. Even though these processes yield resins that are suitable for injection molding, the rate of production is low and the cost high. Alternately, suitable resins can be made by air curing the resins produced by processes described in U.S. No. 3,354,129. Air curing can require up to 30 hours, and darkens the resin, both undesirable features. The high melt flow rate resins produced by the referenced processes are not economically altered to the desired melt flow rate. The inclusion of a branching agent such as 1,2,4-trichlorobenzene as a comonomer in the resin preparation process is a further alternative to producing the desired resins. The presence of branching agents can yield resins undesirably low in ductility and mechanical properties. The problems encountered in the alternative approaches to provide a satisfactory poly(arylene sulfide) resins remain.

Accordingly, it is an objective of the invention to provide a process for altering the melt flow rate of poly(arylene sulfide) resins. It is a further objective to provide a poly(arylene sulfide) composition for injection molding. A still further objective is to provide a poly(arylene sulfide) composition of reduced melt crystallization temperature.

BRIEF SUMMARY OF THE INVENTION

Poly(arylene sulfide) resins are used in injection molding. In accordance with the invention, poly(arylene sulfide), PAS, resins, such as polyphenylene sulfide, PPS, resins, having a melt flow rate above that desired for injection molding, are mixed at an elevated temperature, optionally in the absence of oxygen, with a basic additive such as an inorganic hydroxide or inorganic oxide or an organic metal salt to reduce the melt flow rate, MFR, and the melt crystallization temperature, Tmc, of the final resin product.

DETAILED DESCRIPTION OF THE INVENTION

The poly(arylene sulfide) resins which can be employed in the process of this invention include poly(arylene sulfide) resins which generally have a melt flow rate of at least 100 g/10 min, and preferably at least 500 g/10 min. The poly(arylene sulfide) resins can be linear, branched or lightly crosslinked as in U.S. No. 3,354,129. The presence of a polyhalo-aromatic compound such as 1,2,4-trichlorobenzene in the polymerization reaction mixture comprising a dihalobenzene, an alkali metal sulfide, and an organic amide can increase the degree of branching of the resin. The poly(arylene sulfide) resins are meltable and can have a melting point in the range of about 240° to about 400° C., preferably in the range from about 250° to about 355° C., and most preferably in the range of from about 260° to about 315° C.

The poly(arylene sulfide)s generally can be polyphenylene sulfide resins such as those manufactured by the Phillips Petroleum Company and marketed under the tradename RYTON ®. These PPS resins are available in various types and grades depending upon use. The preferred PPS resins are polyphenylene sulfide resins made by processes that incorporate in the polymerization reaction mixture chemical compounds that increase the resin molecular weight such as by the presence of metal carboxylates described in U.S. No. 3,191,177 or that lightly-branch the resin such as by polyhalo-aromatics, for example 1,2,4-trichlorobenzene, described in U.S. No. 3,354,129. Such lightly-branched resins contain a trisubstituted benzene ring in the polymer chain and can also be referred to as being crosslinked-PPS resins.

The inorganic hydroxides or inorganic oxides of the invention can be selected from the alkali metals of Group IA or the alkaline-earth metals of Group IIA of the Periodic Table of Elements. For example, hydroxides of lithium, sodium, potassium, magnesium, calcium, strontium, and barium and the oxides of magnesium, and calcium are representative. Particularly preferred are sodium hydroxide, calcium hydroxide, and calcium oxide.

The organic metal salts of the invention can be selected from metal salts derived from the alkali metals of Group IA, alkaline earth metals of Group IIA and Group IIB; and organic compounds such as carboxylic acids and phenols.

Specific organic metal salts that are representative of those used in the inventive process include zinc acetate, cadmium acetate, mercury acetate, zinc propionate, sodium phenolate, potassium phenolate, rubidium phenolate, cesium phenolate, magnesium phenolate, calcium phenolate, strontium phenolate, barium phenolate, calcium acetate and the like. Particularly preferred compounds include sodium phenolate therefor and zinc acetate.

The amount of inorganic hydroxide, inorganic oxide or organic metal salt mixed with the poly(arylene sulfide) resin can generally be in the range of about 0.1 to about 2 weight percent based on the total weight of the final resin composition, preferably from about 0.2 to about 1 weight percent based on the total weight of the final resin composition.

Treatment of the poly(arylene sulfide) resins at elevated temperature with the inorganic hydroxides, inorganic oxides or organic metal salts can be carried out at a temperature above the softening or melting point of the preferred PPS resin. The contacting temperatures can be in the range of about 250° to about 400° C., preferably in the range of about 275° to about 325° C.

The treatment can consist of combining the inorganic hydroxide, inorganic oxide or organic metal salt and preferred resin by dry mixing and heating the mixture to above the resin softening or melting temperature in an extrusion device. The duration of extrusion mixing can be from about 2 to about 25 minutes, preferably from about 5 to about 15 minutes.

One means to demonstrate the inventive method is to compare the melt flow rate of the PAS resin before mixing with the melt flow rate of the PAS composition after melt extrusion mixing. A convenient means to prepare PAS resin products of a desired melt flow rate is with a Brabender Instruments Inc. plasticorder. Final PAS resin product can be characterized by measurement of melt flow rate; inherent viscosity; glass transition temperature, Tg; melting temperature, Tm; melt crystallization temperature, Tmc; and ash content.

When the preferred PPS resins are treated in accord with the method described herein, the melt flow rate of the final PPS resin product is reduced preferably by at least a factor of 0.5 and more preferably by at least 0.1 as compared to the initial PPS resin. The inherent viscosity of the product is about 10 percent greater than the initial resin indicating an increase in the apparent molecular weight. The melt crystallization temperature of the product is reduced by about 10° C., preferably about 15° C. or more, as compared to that of the initial resin. The ash content increases from incorporation of the metal salt into the final resin product, the increases being a direct result of the amount of metal compound added. Neither the glass transition temperature nor the melting point are altered significantly by the melt extrusion process.

The melt flow rate, MFR, is measured by ASTM D 1238, Procedure B, Condition 315/5.0. Thermal Analyses are performed on a Perkin-Elmer DSC-2C differential scanning calorimeter. Before measurement each resin sample was quenched from a temperature above its melting point to form a uniform sample, which subsequentially was analyzed at a heating rate of 20° C./minute to 340° C. After 5 minutes at 340° C., the melted sample was cooled at a rate of 20° C./minute to obtain the melt crystallization temperature. The glass transition, crystallization and melting temperatures were obtained from the heating data. The inherent viscosity was calculated from the relative viscosity of a resin measured with 0.4 g resin in 100 ml 1-chloronaphthalene solution maintained at 260° C. in a vapor bath of tetrahydronaphthalene (Tetralin, DuPont). The ash content was measured by weighing the residue obtained by heating a portion of the resin sample for 2 hours at 950±25° C. in a muffle furnace.

The final PPS resin products are useful in injection molding, film forming and fiber spinning processes to make articles of manufacture.

EXAMPLES

The examples provided are intended to assist in a further understanding of our invention. The particular materials employed, species, and conditions are intended to be further illustrative of our invention and not limitative of the reasonable scope thereof.

The examples show that melt extrusion of a mixture of a polyphenylene sulfide resin and a basic additive produces a resin composition with improved properties such as melt flow rate and melt crystallization temperature when compared to the PPS resin before it is mixed with the basic additive.

EXAMPLE I

Various types and grades of PPS resin were mixed with sodium phenolate, sodium hydroxide, zinc acetate, or calcium acetate in a Brabender plasticorder while recording the torque developed. The neat resin was processed in the plasticorder at 300° or 316° C. with a rotor speed of 75 rpm. When the torque value for each softened resin reached a steady value the basic additive was added to the softened resin. The torque value was recorded until a steady value was reached. The torque values and the time between the final and initial steady values are shown in Table I.

EXAMPLE II

The melt flow rate of final PPS resin products made by the process of Example I were measured by ASTM D 1238, Procedure B, Condition 315/5. The results are compared with the MFR valves of the initial PPS resins in Table II.

TABLE I

| | | | | | | |
|---|---|---|---|---|---|---|
| EFFECT OF BASIC ADDITIVES ON MELT VISCOSITY OF PPS RESINS | | | | | | |
| | PPS | | TREATING | TORQUE, METER-GRAM | | Time, |
| RUN | RESIN | MFR[a] | AGENT[b] | Initial | Final | Min |
| 1 | High Molecular Weight, Molding Grade[c] | 75 | Na Phenolate | 840 | 1200 | 13 |
| 2 | PRO6[d] | 111 | Na Phenolate | 490 | 900 | 8 |
| 3 | PRO6[d], CONTROL | 111 | none | 510 | 520 | 9 |
| 4 | PRO6 Compound[e] | 100 | Na Phenolate | 500 | 840 | 15 |
| 5 | P-6[f] | 617 | Na Phenolate | 170 | 410 | 14 |
| 6 | P-6[f] | 617 | Zn Acetate | 540 | 790 | 16 |
| 7 | High Molecular Weight, Molding Grade[c] | 75 | NaOH | 600[k] | 1500[k] | 2.5 |
| 8 | High Molecular Weight, Molding Grade[g] | 82 | NaOH[l] | 560 | 1150 | 5 |
| 9 | High Molecular Weight, Molding Grade, Treated[h] | 42 | NaOH[m] | 720 | 1040 | 3.5 |
| 10 | Run 9 Product[i] | | NaOH | 1040 | 1280 | 3.5 |
| 11 | High Molecular Weight[c] | 75 | NaOH[n] | 640 | 1560 | 4 |
| | | | Ca Acetate[n] | 1560 | 1560 | 2 |
| | | | Zn Acetate[n] | 1560 | 1120 | 1 |
| 12 | High Molecular Weight, Fiber | | | | | |

TABLE I-continued

EFFECT OF BASIC ADDITIVES ON MELT VISCOSITY OF PPS RESINS

| RUN | PPS RESIN | MFR[a] | TREATING AGENT[b] | TORQUE, METER-GRAM Initial | TORQUE, METER-GRAM Final | Time, Min |
|---|---|---|---|---|---|---|
| | Grade[j] | 177 | NaOH | 540 | 740 | 4 |

[a]MFR = melt flow rate, grams/10 minutes
[b]Na Phenolate added 0.88 wt. % based on final resin product; Zn acetate added 0.99 wt. % based on final resin product; NaOH added 0.99 wt. % based on final resin product
[c]LOT 24 made by process described in U.S. Pat. No. 3,919,177 with sodium acetate.
[d]Nominal MFR 120 g/10 minutes resin obtained by air-cure of PPS resin designated V-1 (Phillips Petroleum Co.).
[e]Contains lithium carbonate and high density polyethylene as additives.
[f]Nominal MFR 600 g/10 minutes resin obtained by air-cure of PPS resin designated V-1 (Phillips Petroleum Co.).
[g]Lot 0175 made by process described in U.S. Pat. No. 3,919,177 with sodium acetate.
[h]Made by sodium ion-calcium ion treatment of resin made by process described in U.S. Pat. No. 3,919,177 with sodium acetate.
[i]0.2 wt. % NaOH added to resin product of Run 9.
[j]Nominal MFR 160 g/10 minutes resin made by process described in U.S. Pat. No. 3,919,177 with sodium acetate.
[k]at 300° C.
[l]0.98 wt. % based on final resin product.
[m]0.2 wt. % based on final resin product.
[n]Sequential addition to yield final resin product containing 0.4 wt. % of each compound.

TABLE II

EFFECT OF BASIC ADDITIVES ON PPS RESINS[p]

| | | MELT FLOW RATE, g/10 min. | |
|---|---|---|---|
| Run | PPS Resin | Initial | Final Na Phenolate[b] | Final NaOH[b] |
| 13 | High Molecular Weight[g] | 82 | 31 | 10 |
| 14 | PRO6[d] | 111 | No Flow | 79 |
| 15 | P-6[f] | 617 | 138 | 314 |
| 16 | V-1 (Uncured)[q] | >4000 | 2273 | 1179 |

[p]See Table I for alphabetical footnotes.
[q]Very high melt flow rate PPS resin based on U.S. Pat. No. 3,354,129 (Phillips Petroleum Co.).

The relative reduction in MRF was greatest for the air-cured resins, Runs 14 and 15, as compared to the two uncured types, Run 13 and 16. The reduced MFR is consistent with the increase in torque (a measure of melt viscosity) shown in Table I.

EXAMPLE III

PPS resin products made by treating various types and grades of PPS resins with sodium hydroxide by the process of Example I were characterized by measurement of MFR, inherent viscosity, thermal properties and ash content. The results are compared with the values of the initial PPS resins in Table III.

The MFR is altered by at least a factor of 10 for the high molecular weight (Runs 17 and 18) and the lightly branched (Run 21) PPS resins. The final PPS resin products all have a higher inherent viscosity than the initial PPS resin suggesting an increase in molecular weight, a condition that is consistent with reduced MFR. The melt crystallization temperature of the final resin product is significantly reduced as compared to the initial PPS resin except for the lightly branched resin. The high molecular weight PPS resin has the largest reduction in Tmc. Reduced Tmc valves improve the film forming characteristics of PPS resins. The other thermal properties Tg, Tcc and Tm are essentially unchanged. As expected the ash content increases from the presence of the basic additive in the final resin product.

EXAMPLE IV

Off-specification high molecular weight PPS resin, fiber grade, was treated with sodium hydroxide as described in Example I to give a final PPS resin product. This product was pelletized and the pellets used to spin fiber in air-quench process through a one inch die with a single hole, 0.020 inch diameter × 0.050 inch length. A constant velocity piston spinning unit requiring about 20 grams of resin was used. The upper heating zone was operated at about 200° C. and the lower heating zone at about 300° C. Extrusion rate was 1 cc/minute and takeup rate was about 200 feet per minute. The undrawn denier of the fiber was in the range from about 100 to about 150. In a separate step the fiber was drawn at 100° C. with a feed of 20 feet per minute.

TABLE III

EFFECTS OF SODIUM HYDROXIDE ON PPS PROPERTIES**

| Run | PPS Resin | Amount of NaOH Wt. % | MFR g/10 min I | MFR g/10 min F | Inh. Visc. (dl/g) I | Inh. Visc. (dl/g) F | Tg (°C.) I | Tg (°C.) F | TCC (°C.) I | TCC (°C.) F | Tm (°C.) I | Tm (°C.) F | Tmc (°C.) I | Tmc (°C.) F | Ash Content (°C.) I | Ash Content (°C.) F |
|---|---|---|---|---|---|---|---|---|---|---|---|---|---|---|---|---|
| 17 | High Molecular Weight[g] | 0.99 | 102 | 10 | 0.27 | 0.31 | 91 | 92 | 147 | 146 | 271 | 271 | 138 | 172 | 0.83 | 2.54 |
| 18 | High Molecular Weight[c] | 0.99 | 70 | 5.7 | 0.26 | 0.28 | 92 | 93 | 157 | 146 | 271 | 272 | 193 | 170 | 0.29 | 2.05 |
| 19 | High Molecular Weight, Molding Grade, Treated[h] | 0.4 | 51 | 10.2 | 0.27 | 0.32 | 93 | 96 | 156 | 141 | 272 | 273 | 196 | 186 | 0.29 | 1.22 |
| 20 | High Molecular Weight, Fiber Grade[j] | 0.99 | 177 | 45 | 0.24 | 0.27 | 91 | 94 | 142 | 143 | 273 | 274 | 196 | 186 | 0.84 | 2.48 |
| 21 | Lightly Branched, | 0.99 | 919 | 42 | 0.20 | 0.23 | 89 | 92 | 137 | 129 | 274 | 272 | 190 | 183* | 0.63 | 2.36 |

TABLE III-continued

| | | Amount of NaOH | MFR g/10 min | | Inh. Visc. (dl/g) | | Tg (°C.) | | TCC (°C.) | | Tm (°C.) | | Tmc (°C.) | | Ash Content (°C.) | |
|---|---|---|---|---|---|---|---|---|---|---|---|---|---|---|---|---|
| Run | PPS Resin | Wt. % | I | F | I | F | I | F | I | F | I | F | I | F | I | F |
| 22 | 0.69% TCB V-1 (Uncured)q | 0.99 | 4000 | 1179 | | | 146 | | | | 201 | | | | | |

EFFECTS OF SODIUM HYDROXIDE ON PPS PROPERTIES\*\*

I = Initial PPS Resin,
F = Final PPS Resin Product.
\*This is a shoulder to the main peak.
\*\*See Table I for alphabetical footnotes.

TABLE IV

EFFECT OF NaOH ON FIBER PROPERTIES

| Run | PPS Resin | MFR | Draw Ratio | Denier | Tenacity$^r$ | Elongation | Initial Modulus$^r$ |
|---|---|---|---|---|---|---|---|
| 23 | Control | | 3.8 | 40 | 4.3 | 24% | 51 |
| 24 | Off-Spec | 410 | — | 40 | 2.2 | 26% | 39 |
| 25a | 24+ NaOH$^s$ | 202 | 4.4 | 37 | 3.0 | 22% | 44 |
| 25b | Run 24+ NaOH$^s$ | 202 | 4.1 | 37 | 2.4 | 29% | 37 |
| 26a | Run 24+ NaOH, Filtered$^t$ | 211 | — | 38 | 3.5 | 19% | 50 |
| 26b | Run 24+ NaOH, Filtered$^t$ | 211 | — | 40 | 2.0 | 40% | 27 |

$^r$Grams per denier
$^s$Final resin product from melt mixing 0.4 wt. % NaOH and Run 24 PPS, unfiltered.
$^t$Final resin product (0.4 wt. % NaOH) from melt mixing Run 24 PPS with a NaOH/PPS masterbatch.

Runs 25a and 25b illustrate how fiber properties are influenced by draw ratio, the higher ratio giving better fiber properties. Runs 26a and 26b illustrate how drawing the fiber to yield an elongation value of about 20% (Run 26a) gives a fiber with properties essentially equivalent to those of the control (Run 23). The high elongation value for Run 26b indicates the fiber was insufficiently drawn.

EXAMPLE V

A series of lightly-branched PPS resins were prepared by incorporation of various amounts of the branching agent 1,2,4-trichlorobenzene, TCB, in the polymerization reaction mixture.

Polymerizations were performed in a one-liter or two-gallon stainless steel autoclave manufactured by Autoclave Engineers, Inc. equipped with a stirrer of about 300 rpm speed. A typical 1.00 mole scale reaction containing about 0.4 mole % branching agent is described. The autoclave was charged with 1.00 mole NaSH (93.90 gram of an aqueous solution containing 59.7 weight percent of NaSH, 0.156 weight percent of Na$_2$S), 1.05 mole NaOH (42.00 g, reagent grade) and 200 grams of N-methyl-2-pyrrolidone, NMP. The autoclave was equipped for dehydration and heated to 160° C. in 30 minutes, then further heated to 205° C. in the next 30 minutes. During this latter period a total of at least 46 mls of liquid distillate was collected. A mixture of p-dichlorobenzene, DCB, (152.00 g, 1.034 mol), 1,2,4-trichlorobenzene (0.74 g, 0.004 mol) and 100.00 grams of NMP was added to a charging cylinder. The charging cylinder was pressurized with nitrogen to 100 psig and purged three times. The charging vessel was heated by a heat gun. The DCB/TCB solution was transferred into the autoclave under 100 psig of nitrogen pressure. The charging vessel was repressurized with nitrogen to 100 psig and depressurized into autoclave again. The valve for charging was then closed. The reaction mixture was heated to 235° C. in 30 min. and held at that temperature for one hour. The temperature was then increased to 265° C. in 15 min. and maintained at that temperature for two hours. The stirring and heating was stopped and the autoclave was allowed to cool overnight. The crude product was removed from the autoclave and washed once in hot isopropyl alcohol (1 liter) and filtered. The filtrate was saved for gas chromatography analysis. The product was slurred and filtered eight times in hot deionized water. The final product was vacuum dried at 100° C. overnight.

The isopropyl alcohol was analyzed for unreacted DCB on a 10 ft. column made of ¼" stainless steel tubing with 5% OV-225 on 30/60 Chrome T and a temperature setting of 175° C. The alcohol extract is defined as R.F.×[area of DCB/(area of DCB+area of NMP)], where the response factor (R.F.)=1.16. The alcohol extract of less than 1 weight percent should be avoided. In the polymerizations described in this example the alcohol extract was maintained at about 1.5 weight percent to prepare PPS resins of equivalent quality.

The series of PPS resins made by the procedure described above with varying amounts of the branching agent, 1,2,4-trichlorobenzene, were treated with sodium hydroxide in the Brabender plasticorder. The MFR of the final resin products are compared to that of the initial resins in Table V.

TABLE V

EFFECT OF NaOH ON MFR OF BRANCHED PPS

| Run | TCB$^u$ Mole % | NaOH$^v$ Present, wt. % | MFR, g/10 min. Initial | MFR, g/10 min. Final |
|---|---|---|---|---|
| 27 | 0.2 | 0.99 | 1329 | 85 |
| 28 | 0.4 | 0.4 | 536 | 61 |
| 29 | 0.6 | 0.4 | 367 | 33 |

TABLE V-continued
EFFECT OF NaOH ON MFR OF BRANCHED PPS

| Run | TCB[u] Mole % | NaOH[y] Present, wt. % | MFR, g/10 min. Initial | Final |
|---|---|---|---|---|
| 30 | 0.8 | — | 75 | — |

[u]Mole % based total moles of polychlorobenzene compounds present in the polymerization reaction mixture.
[y]Percentage based on amount present in final resin product.

The final resin product in Runs 27, 28 and 29 had a MFR below the 100 g/10 minutes target and are suitable for injection molding applications. The initial resin with the highest degree of branching, Run 30, had an initial MFR that is within the desired range and consequently was not treated to alter the MFR.

EXAMPLE VI

The final PPS resin products from Runs 27, 28 and 29 and the initial branched PPS resin prepared with 0.8 mole % TCB, Run 30, were compared on the basis of melt stability. Each resin or resin product was held in the barrel of the MFR apparatus for 5 and 30 minutes before the flow measurement was begun. The data obtained are shown in Table VI. For comparison two high molecular weight PPS resins and the final PPS resin products resulting from melt mixing the two resins with sodium hydroxide were measured by the same procedure. The results are shown in Table VII.

TABLE VI
MELT STABILITY OF BRANCHED PPS RESINS

| Run | TCB Mole % | NaOH, wt. % | MFR, g/10 min. 5 min. | 30 min. | MFR Ratio (MFR)30/(MFR)5 |
|---|---|---|---|---|---|
| 27a | 0.2 | 0.99 | 85 | 253 | 2.97 |
| 28a | 0.4 | 0.4 | 61 | 179 | 2.93 |
| 29a | 0.6 | 0.4 | 33 | 67 | 2.03 |
| 30a | 0.8 | NONE | 75 | 193 | 2.57 |

TABLE VII
MELT STABILITY OF HIGH MOLECULAR WEIGHT RESINS

| Run | PPS* Resin | Melt Flow Rate, g/10 min. 5 min. | 30 min. | MFR Ratio (MFR)30/ (MFR)5 |
|---|---|---|---|---|
| 31 | High Molecular Weight[c] | 70 | 121 | 1.73 |
| 32 | Run 27 Resin + NaOH | 5.7 | 10.4 | 1.82 |
| 33 | High Molecular Weight[g] | 102 | 182 | 1.78 |
| 34 | Run 13 Resin Product | 10 | 19 | 1.9 |

*See Table I for alphabetical footnotes that describe the PPS resin.

The melt stability of the final PPS resin products shown in Table VI was less than that of either the high molecular weight resins or the final PPS resin products shown in Table VII, but was sufficient for injection molding applications.

EXAMPLE VII

A branched PPS resin made in a polymerization reaction containing 0.3 mole % TCB and having MFR of 458 g/10 min. was mixed with glass fiber (Owens Corning Co. OC-497) in a ratio of 60/40 by weight. Various metal hydroxides were added in 0.6 wt. % amounts to the binary blend. The ternary mixtures were processed as in Example I to yield glass fiber reinforced final PPS resin products which are characterized by MFR values shown in Table VIII.

TABLE VIII
EFFECT OF METAL HYDROXIDES ON REINFORCED PPS RESINS

| Run | Metal Hydroxide | MFR, g/10 min. |
|---|---|---|
| 35 | Ca(OH)$_2$ | 41 |
| 36 | LiOH.H$_2$O | 32 |
| 37 | NaOH | 18 |
| 38 (Control) | none | 78 |

The upper MFR specification limit of glass fiber reinforced PPS resin, available from Phillips Petroleum Co. as RYTON ® R-4, is 49 grams/10 minutes. Each of the final PPS resin products containing glass fiber reinforcement are below the upper MFR value. The binary mixture (Run 38) fails. These data demonstrate that metal hydroxides can be melt blended into various reinforced PPS resin compounds to adjust the MFR for injection molding applications.

EXAMPLE VIII

A high molecular weight PPS resin and a glass fiber/PPS composition were mixed with various basic additives of the inorganic hydroxide or inorganic oxide type by the procedure described in Example I. The results are summarized in Table IX.

TABLE IX
EFFECT OF BASIC ADDITIVES ON PPS RESINS

| Run | Basic Additive | High Molecular Weight PPS[w] | MFR g/10 min. Glass Fiber/PPS Compound[x] |
|---|---|---|---|
| 39 | none | 26 | 37 |
| 40 | LiOH—H$_2$O | 9.1 | 19 |
| 41 | NaOH | 6.5 | 19 |
| 42 | KOH | 18.8 | — |
| 43 | Mg(OH)$_2$ | 19.3 | — |
| 44 | MgO | — | 23 |
| 45 | Ca(OH)$_2$ | 12.0 | 18 |
| 46 | CaO | — | 23 |
| 47 | Li$_2$CO$_3$ | — | 31 |
| 48 | ZnO | — | 39 |

[w]Basic additives present in Runs 40, 41, 42 at 2 mole/gram-mole PPS and in Runs 43 and 45 at 1 mole/gram-mole PPS.
[x]60% High molecular weight resin, film grade-40% glass fiber (OC-497). Basic additive present in each run at 0.6 wt. % based on total weight of final resin product.

At equivalent concentrations of hydroxide in high molecular weight PPS, sodium hydroxide (Run 41) was the most effective basic additive. In the glass fiber/PPS compound, the hydroxides were more effective than the oxides of the Group IA and Group IIA metals. The weak base lithium carbonate gave a small decrease in MFR. Zinc oxide had no effect.

EXAMPLE IX

A high molecular weight resin, molding grade, having a MFR of 62 g/10 min, was alternately acid washed and melt mixed with basic additives. The MFR of each product was measured. Acid washing was with 3% acetic acid at 225° C. for 3 hours followed by filtration to recover each PPS resin product. The results are summarized in Table X.

TABLE X
REVERSIBILITY OF EFFECT OF BASIC ADDITIVES

| Run | Description | MFR (g/10 min) |
|---|---|---|
| 49 | High Molecular Weight PPS | 62 |
| 50 | Acid Washed Product-49 | 116 |
| 51 | NaOH/PPS Product[y] | 17 |
| 52 | Acid Washed Product from Run 51 | 72 |
| 53 | Ca(OH)$_2$/PPS Product[z] | 42 |

TABLE X-continued
REVERSIBILITY OF EFFECT OF BASIC ADDITIVES

| Run | Description | MFR (g/10 min) |
|---|---|---|
| 54 | Acid Washed Product from Run 53 | 66 |

[1] 0.74 wt. % NaOH based on final PPS resin product.
[2] 1.35 wt. % Ca(OH)$_2$ based on final PPS resin product.

The final resin products of Runs 51 and 53 have reduced MFR values compared to those of each starting resins. A single acid washing of these final resin products increases the MFR values significantly.

That which is claimed is:

1. A process comprising mixing poly(arylene sulfide) resin with an effective amount of a melt flow rate additive at a temperature above the melting temperature of the poly(arylene sulfide) resin to produce a final resin product having reduced melt flow rate and reduced melt crystallization temperature compared to said poly(arylene sulfide) resin alone and before treatment, wherein the melt flow rate additive is selected from among the group consisting of cadmium acetate, mercury acetate and zinc propionate and is present in an amount of from about 0.1 to about 2 weight percent based on the total composition.

2. A process of claim 1 wherein the poly(arylene sulfide) resin is a polyphenylene sulfide resin.

3. A process of claim 1 wherein the poly(phenylene sulfide) resin alone and before treatment has a melt flow rate greater than that sufficient for use in injection molding, film forming or fiber spinning processes.

4. A process of claim 3 wherein the melt flow rate is greater than 100 grams per 10 minutes.

5. A process of claim 3 wherein the polyphenylene sulfide resin is a copolymer having incorporated therein less than 2 mole percent trisubstituted aromatic ring in the polymer chain.

6. A process of claim 1 wherein said mixing is in the absence of oxygen.

7. A composition comprising poly(arylene sulfide) resin and an effective amount of a melt flow additive selected from the group consisting of cadmium acetate, mercury acetate and zinc propionate wherein the melt flow rate additive is present in an amount from about 0.2 to about 1 weight percent based on the total composition.

8. A composition of claim 7 wherein the poly(arylene sulfide) resin alone and before treatment is a polyphenylene sulfide resin having a melt flow rate greater than 100 grams per 10 minutes.

9. A composition of claim 7 wherein the composition contains reinforcing fibers, fillers, processing aids, or corrosion control agents, or mixtures thereof.

10. A composition of claim 7 wherein the melt crystallization temperature of the composition is at least 10° C., lower than the melt crystallization temperature of the poly(arylene sulfide) resin alone.

* * * * *